April 10, 1945. A. E. WIGELSWORTH 2,373,521
METHOD FOR BLANCHING VEGETABLE MATERIALS
Filed Nov. 24, 1942 3 Sheets-Sheet 2

ARTHUR E. WIGELSWORTH,
INVENTOR.

BY
ATTORNEY.

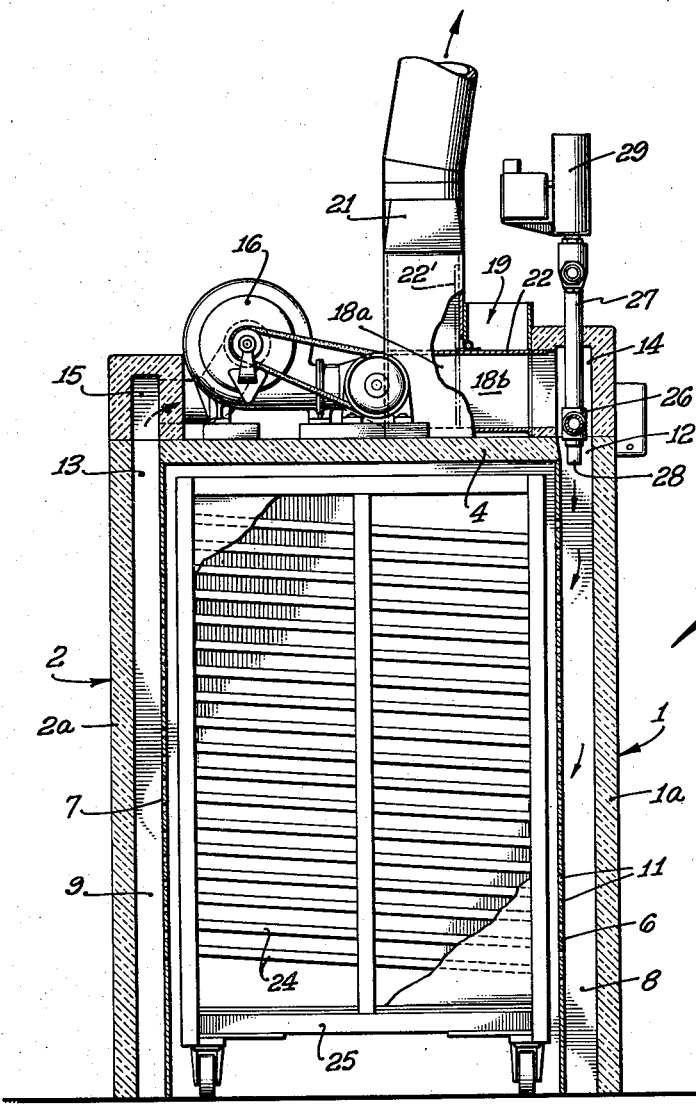

UNITED STATES PATENT OFFICE 2,373,521

METHOD FOR BLANCHING VEGETABLE MATERIALS

Arthur E. Wigelsworth, Los Angeles, Calif., assignor to Anabolic Food Products, Inc., Glendale, Calif., a corporation of Delaware Application November 24, 1942, Serial No. 466,831

3 Claims. (Cl. 99—103)

This invention relates to the blanching of vegetable materials, such as vegetables, fruits and the like, prior to a dehydrating treatment, and the principal object is to provide an improved blanching method in which a substantially uniform blanching treatment is accomplished without sacrifice of efficiency of heat utilization.

The term "blanching" as used herein refers to the treatment of a vegetable material with steam preparatory to dehydration thereof, for the purpose of preventing or minimizing the occurrence of undesired changes during drying and subsequent storage or shipment, such as changes in color, odor, or texture, or loss of vitamins, and also to cause partial precooking of the material.

One of the particular objects of the invention is to provide a blanching method in which the material to be blanched is subjected to contact by a positively circulated gaseous medium and the temperature of this medium is gradually increased by the controlled introduction of live steam during the blanching operation, whereby an optimum control of the blanching treatment is attained.

A further object of the invention is to provide for bringing the material under treatment uniformly up to the desired temperature in minimum time and for cooling the treated material down uniformly and quickly after the blanching treatment, whereby the treatment may be completed in the shortest possible time, with uniform and effective blanching of all parts of the material, while at the same time avoiding excessive treatment of any parts of the material.

A further object of the invention is to provide a method of the character described in which a controlled circulation of air and heating medium is employed for both the blanching operation and the subsequent cooling procedure.

In the blanching of food materials it is common practice to subject different raw materials to various lengths and temperatures of treatment in order to secure the desired precooking and color setting. For example, a blanching period in the neighborhood of three minutes has been found adequate in the case of cabbage, while carrots may require as much as ten minutes blanching in order to secure the desired results. It follows that a rather precise control of the duration of blanching treatment must be exercised, and that following the blanching operation the material under treatment should be cooled down to below the blanching temperature rather rapidly and uniformly. With the use of the method and apparatus herein described the desired blanching temperature may be attained very promptly, continued for the requisite time, and the temperature of the blanched material promptly reduced to a safe level thereafter. Furthermore the method provides a partial drying of the blanched material during the cooling stage through use of a portion of the sensible heat of the blanched material, which not only adds to the heat economies of the process but beneficiates the desired color setting.

I am appreciative of the fact that attempts have heretofore been made to utilize live steam in a so-called "batch" blanching procedure, as by directing steam jets against the material to be blanched, but so far as can be determined these procedures failed to secure an even blanching of the material. According to the process of the present invention the material to be blanched is placed in properly distributed manner within a blanching chamber, usually by being spread uniformly over a plurality of trays arranged in spaced relation in the blanching chamber, and a gaseous medium, such as air, is caused to be circulated through the chamber in direct contact with the material to be treated, accompanied by the introduction of live steam to the gaseous medium during its forced circulation. When the steam is introduced into the gaseous medium there is a progressive increase in temperature of the body of gaseous medium under circulation, and heat is thus uniformly transmitted to the material undergoing treatment. As the temperature is increased the proportion of steam in the body of gaseous medium being circulated is constantly increased, increasing the rate of heat exchange to the material being treated, providing a substantially uniform heat transfer to the entire mass of material undergoing treatment without overheating any individual sections or underheating others. Since the temperature of the material is dependent upon the wet-bulb temperature, it is essential that the relative humidity of the gaseous medium be increased as well as the temperature, and a condition of complete saturation is preferred since this eliminates the necessity of controlling the wet-bulb temperature. When the desired temperature has been attained in the mass, and has been maintained for a period adequate to effect the desired degree of blanching, the supply of live steam is discontinued and the body of gaseous medium is then exhausted to the atmosphere and an additional quantity of cool gaseous medium such as atmospheric air is introduced to the blanching chamber and circulated over and past the material until the temperature thereof has been reduced sufficiently to prevent occurrence of any undesired changes in the material and to permit handling thereof. The cool gas employed in this cooling step is preferably unsaturated with water vapor, as is the case when ordinary atmospheric air is introduced, and its capacity to pick up water vapor is increased as it becomes heated upon entering the apparatus. Consequently there is a considerable evaporation of water from the material during this stage, which contributes to the cooling effect and also causes a partial drying of the blanched material.

The method of the present invention may be carried out in an apparatus comprising a rectangular housing provided with door means at one end and adapted to receive a car or truck carrying a plurality of trays on which the material to be blanched is spread out. The trays are arranged in the truck in such manner that a gaseous heating medium (steam) or a cooling medium (such as air) can be circulated over and under the material to be treated, transversely of the housing. At the respective sides of the housing, inlet and outlet manifold spaces are provided through which the gaseous medium may be introduced and withdrawn in such manner as to provide substantially uniform flow thereof across the chamber, and a suitable circulating means such as a blower or the like is provided, together with connecting conduits, for maintaining a circulation of the medium within and through the housing. The apparatus is further provided with means for introducing a heating medium such as steam, preferably directly into the inlet manifold, to cause production of the desired conditions of temperature and humidity for blanching. Cooperating with the circulatory system, the apparatus is further preferably provided with a damper arrangement whereby the continued recirculation of the gaseous medium may be interrupted and a cooling medium such as atmospheric air may be drawn into the housing, passed in contact with the blanched material, and subsequently discharged from the apparatus.

The above and other features will be brought out in the ensuing description of a preferred embodiment of the apparatus and of the preferred practice of the method, or will be apparent from such description. A preferred form of apparatus is illustrated in the accompanying drawings in which:

Fig. 3 is a transverse section thereof as taken on line 3—3 in Fig. 1.

Figure 1:
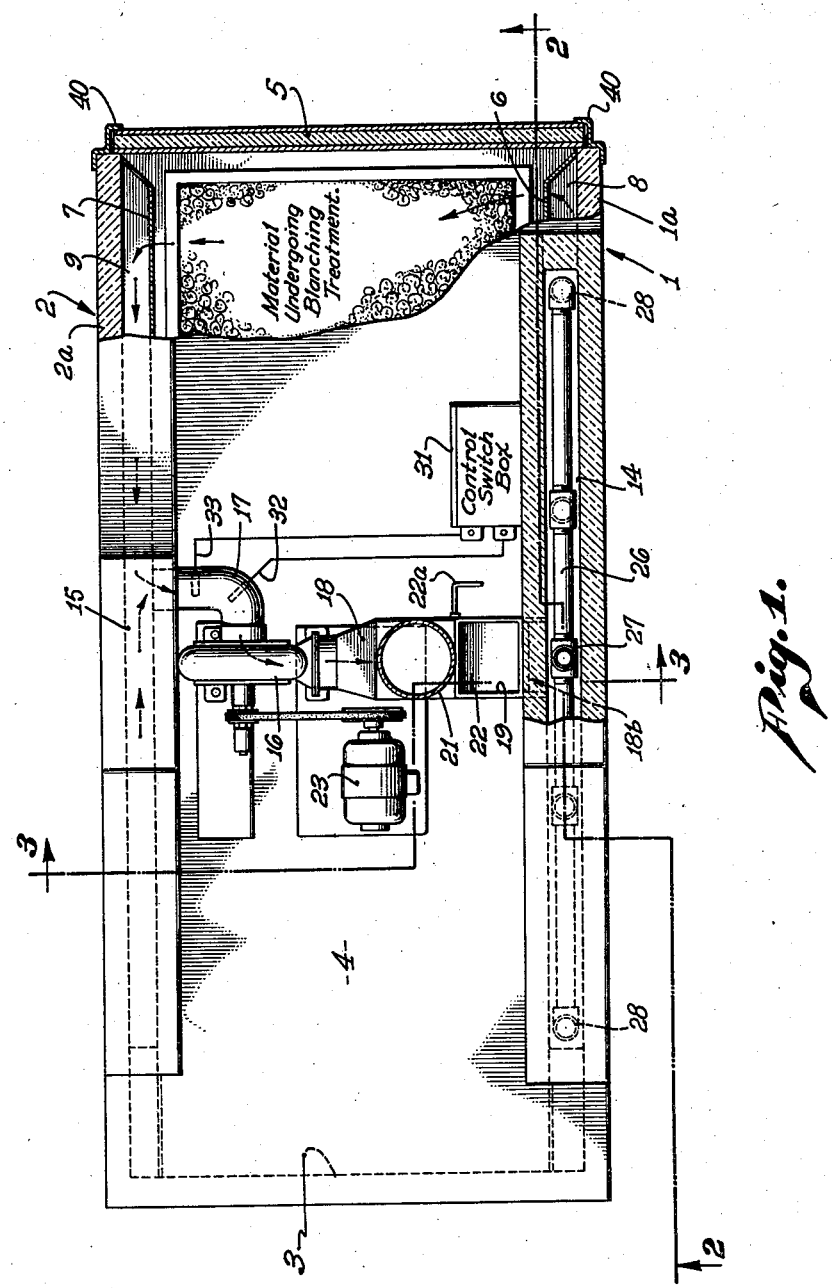
Fig. 1 is a partly broken away plan view of the apparatus.

Referring to the drawings, the device is shown as comprising a rectangular housing defined by side walls 1 and 2, an end wall 3, a top wall 4 and a vertical slidable door member 5 defining the opposite end wall. The side walls 1 and 2 are exteriorly insulated as at 1a and 2a and are provided with interior wall members 6 and 7, respectively, spaced inwardly from the respective side walls 1 and 2 so as to define longitudinally and vertically extending spaces 8 and 9 which may comprise the inlet and outlet manifolds for the desired circulation of the heating and cooling medium. The space between the inner wall members 6 and 7 constitutes the blanching chamber. The walls 6 and 7 are provided with a plurality of perforations 11 through which the desired circulation of gaseous medium is caused to take place. Said perforations 11 are distributed substantially uniformly over the portions of wall members 6 and 7 between which the material to be blanched is disposed as described hereinafter. The upper wall 4 is provided with elongated slots or openings 12 and 13 above the respective manifold spaces 8 and 9, and suitable headers 14 and 15 are provided above the respective openings.

The gas circulatory system may comprise a blower 16 having its inlet connected by duct 17 to the outlet header 15 and its outlet connected by duct 18 to the inlet header 14. The duct 18 is provided with an inlet duct or opening 19, communicating with the atmosphere, and a discharge duct or stack 21 also communicating with the atmosphere or other point of discharge, together with a movably mounted damper member 22 adapted to be located in a position such as shown in full lines in Fig. 3 wherein the duct 18 is caused to be continuous and open to communication from the blower 16 to the header 14, and communication between duct 18 and both ducts 19 and 21 is shut off. The damper further is adapted to be moved to an alternative position such as is indicated in dot-dash lines at 22' in Fig. 3 wherein the duct 18 is divided into separate compartments 18a and 18b, the former of which is in communication with the stack 21, while the space 18b is in communication with the inlet duct 19. A suitable operating lever 22a may be provided to move the damper 22 between the indicated positions. With the damper in the full line position the blower 16, operated through the agency of a motor or the like 23, is adapted to force the gaseous medium into the inlet manifold space 8 and withdraw the medium from the outlet manifold space 9, keeping the gaseous medium in constant circulation past the material to be blanched. The material to be blanched is located on a plurality of trays 24 (preferably screen-bottomed) mounted on a truck or car 25 which is disposed within the blanching chamber defined between the perforated wall members 6 and 7, the top wall 4, the end wall 3 and the door 5.

Figure 2:
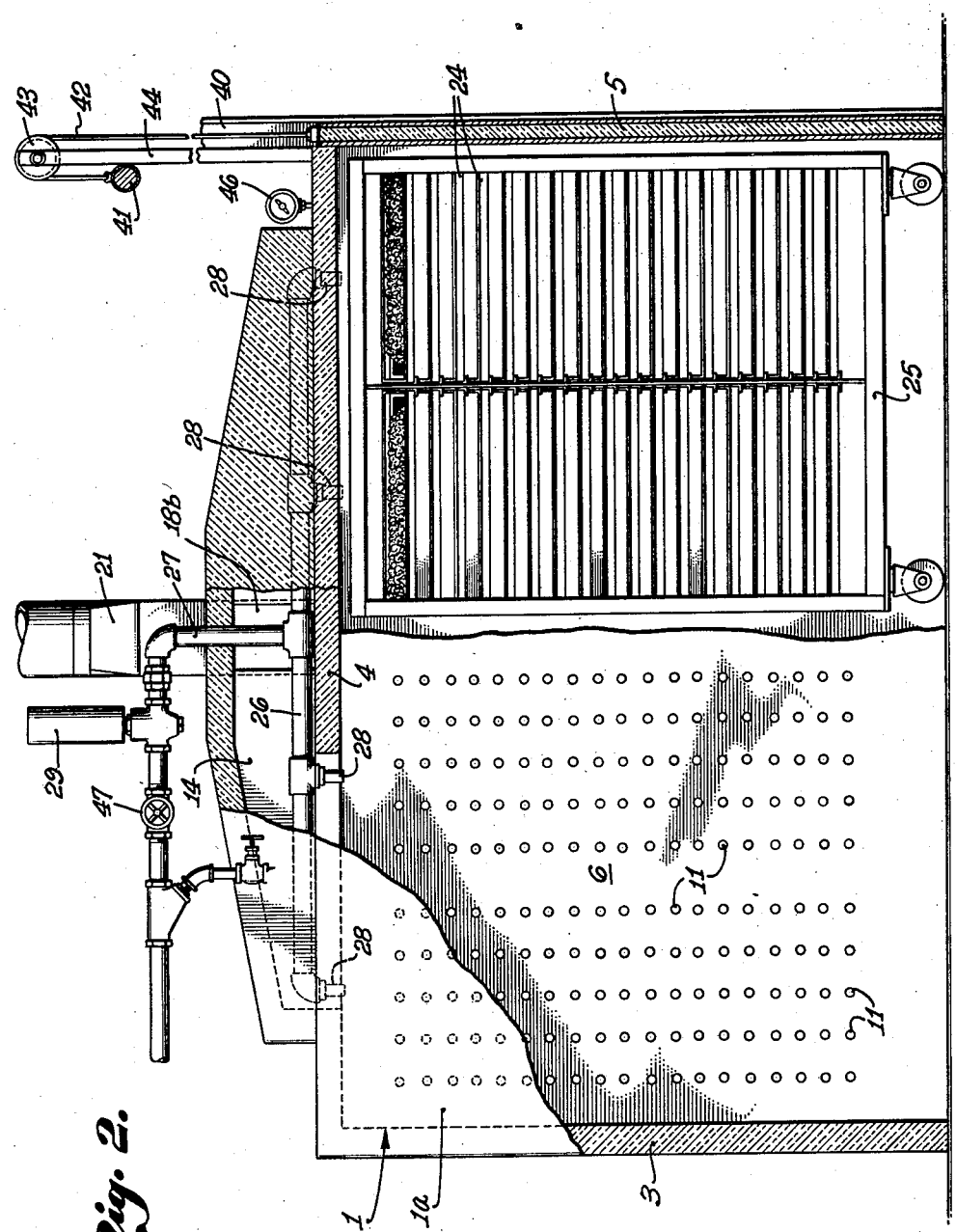
Fig. 2 is a partly broken away sectional elevation of the apparatus as taken on line 2—2 in Fig. 1.

In order to secure the desired heating of the material on the trays 24 live steam is introduced to the inlet manifold space 8 as through the agency of a steam manifold 26 provided with an inlet line 27 and a plurality of discharge nozzles 28. The inlet steam line 27 is provided with a main steam valve 47 and with a control valve 29 which may be associated with a thermostatic control mechanism indicated at 31 through conventional circuit means, not shown, whereby the admission of steam through the line 27 may be interrupted when the temperature, as measured at the exhaust duct 17, reaches the desired maximum value. A thermostatic control element such as vapor pressure temperature bulb may be located in the duct 17 as indicated at 32. The housing 1 is conveniently made of such size as to receive a pair of trucks or cars 25, but one of which is indicated in Fig. 2.

The apparatus may be employed in the blanching treatment of a particular material according to the method of this invention in the following manner: A pair of trucks 25, each loaded to the desired extent with a plurality of trays 24 on which the particular material is evenly spread, are placed within the apparatus. The door 5 is adapted for vertical movement within guide members 40 and is conveniently provided with a counterweight 41 carried by cables 42 passed over pulleys or the like 43 which are in turn carried on a suitable superstructure 44. When the apparatus is charged with the two trucks, the circulatory system is placed in operation by energizing the motor 23, driving the blower 16. The damper 22 is placed in the full-line position of Fig. 3, and the circulation is thus established as a continuous re-circulation through the duct 18 and manifold 8, through the perforations 11 in the plate or wall 6, thence across the space occupied by the trucks, thence through the openings 11 in the wall 7 into the space 9 and back through duct 17 to the blower 16. The valve means 47 is then opened to admit steam to the manifold space 8, mixing with and heating the circulated air and transmitting heat to the material to be blanched by direct contact and by condensation thereupon. The re-circulation of the gaseous medium saturated with water vapor is continued until the desired temperature has been attained (as measured by the bulb 32, for example), whereupon the valve 29 will be actuated through the agency of the control switch mechanism in the box 31, to decrease or completely interrupt the steam flow through the manifold 26, and to thereafter control the admission of additional steam to maintain the desired temperature. Although such automatic control is desirable, it will of course be understood that the admission of steam may if desired be controlled by manual operation of the valve. A timer 46 may then be started by the operator, being set for the desired duration of the blanching period required in connection with the treatment of the particular material on the trays 24.

The temperature and time of blanching vary somewhat with different vegetable materials. In general, the temperature should be maintained between 180° and 212° F., and in most cases a temperature between about 190° and 200° F. is satisfactory. The time required varies, for example, from about two or three minutes for some materials such as cabbage or celery, to about ten minutes for other materials such as carrots or turnips. For most vegetables, the time required is between these limits, although it will of course be understood that the invention is not limited to any particular time or temperature of treatment.

When the desired blanching period has elapsed, as indicated by the timer 46, the main steam valve 47 in the steam line 27 may be closed, and the damper 22 moved to the dot-dash position shown in Fig. 3. More preferably, I may incorporate the timer 46 in the circuit of the valve 29 so that when the desired time has elapsed the steam line is closed at the valve 29, automatically. Continued operation of the blower 16 will thus cause atmospheric air at relatively low temperature to be drawn in through the opening 19 into the passage portion 18b, through the space 8 into the blanching chamber, thence into the space 9 and out to the atmosphere through the header 15, blower 16, duct 18, and stack 21.

The circulation of atmospheric air through the blanching chamber and in contact with the heated material on the trays 24 will result in a prompt cooling of this material by direct heat transfer and by cooling produced by evaporation of surface moisture. Thus, part of the sensible heat of the material is utilized to effect a partial dehydration of the material following the blanching operation. The rapid and uniform reduction of the temperature provides a sharp control of the effects of the heat treatment and prevents undesired effects that sometimes occur if the material or a portion of it is allowed to remain at temperatures above 180° F. for a period materially longer than is actually required for effective blanching. When the temperature of the material has been reduced to a reasonably low value, such as in the neighborhood of 120° F., the door 5 may be raised and the trucks 25 withdrawn. This allowable low temperature may be indicated by the bulb 33, if desired. The apparatus is thus ready for a repetition of the blanching cycle on a new set of loaded trucks.

While I have shown the damper 22 as being manually controlled, it will be apparent to those skilled in the art that automatic operation of this damper as a result of completion of the blanching cycle may readily be provided. Similarly, other modifications of the construction will occur to those skilled in the art, and for this reason I do not choose to be limited to the specific details of construction herein described, but rather to the scope of the subjoined claims.

According to the method herein described, the material to be blanched is subjected to substantially uniform contact with a body of gaseous medium containing live steam supplied through the header 26 and jets 28. This live steam is not permitted to directly impinge upon the material on the trays 24 but rather is caused to be disseminated through the manifold space 8 and to be drawn past the material on the trays 24 through the openings 11, as an evenly distributed uniformly heated and substantially saturated mass which generally also contains some condensed water particles carried in suspension. This gaseous heating agent consists principally of air at the start of the blanching procedure, and the proportion of steam is increased by the addition of further steam as the body of gaseous medium is recirculated. The gaseous heating agent (mixed gas and steam) is thus introduced substantially uniformly over one entire side of the space within which the material is disposed and withdrawn substantially uniformly at the opposite side of such space, resulting in substantially uniform transverse flow thereof across the blanching zone throughout the height and length of such zone and consequent uniform heating of all parts of the material on the trays. As the body of gaseous medium is further saturated by additional steam and the temperature thereof increases toward the temperature of the inlet steam, as a maximum, the temperature of the material on the trays 24 also increases, so that no great temperature differential between the material and the gaseous medium is ever encountered. For this reason the material undergoing treatment is caused to be brought up to temperature in a very uniform fashion, and overblanching of portions of the material is to all purposes completely eliminated. Similarly, when the blanching treatment has been continued for the desired length of time the immediate introduction and uniform circulation of atmospheric air will start to cool the material down to the desired handling temperature with substantially the same degree of uniformity as was attained during the heating step. It has been observed that the constant introduction of the heated gaseous mixture throughout substantially the full height and length of the chamber, as from the space 8, and the comparable withdrawal of the mixture throughout substantially the entire height and length of the chamber, as through the space 9, maintains a very even temperature throughout the chamber as a whole and eliminates any dead air spaces or uneven distribution of steam and consequent heating which would interfere with even blanching of the material.

I claim:

1. The method of blanching vegetable material which comprises placing such material in a blanching zone within an enclosed chamber; passing a gaseous medium substantially uniformly across said zone and in contact with the material therein, and recirculating the gaseous medium in a path including said zone; introducing live steam into the recirculated gaseous medium at a position removed from the blanching zone until the gaseous medium is heated to blanching temperature and is substantially saturated with water vapor; and continuing such recirculation to subject the material to direct contact with the resulting heated and substantially saturated gaseous medium until the desired blanching treatment is effected.

2. The method as set forth in claim 1 and including the subsequent steps of discontinuing such recirculation when the blanching treatment is completed, and thereupon introducing a relatively cool gaseous medium into said zone and discharging it therefrom after contact with said material, to quickly reduce the temperature of the material and cause evaporation of water therefrom.

3. The method of blanching vegetable material which comprises: placing the material in distributed condition at a plurality of levels in a substantially enclosed chamber; introducing a body of gaseous medium at one side of the chamber substantially uniformly over such side and similarly withdrawing such body from the opposite side of such chamber; maintaining such body in continuous recirculation through said chamber; introducing live steam into admixture with said body at a position exteriorly of said chamber whereby the temperature of said body is increased to the desired blanching temperature; maintaining recirculation of said body together with steam so introduced, until the desired blanching treatment has been effected; and thereupon introducing a relatively cool body of gaseous medium to said chamber in the absence of added live steam, and discharging such body from said chamber after contact with the material therein, until the temperature of said material is reduced sufficiently for handling.

ARTHUR E. WIGELSWORTH.